3,244,774
VULCANIZATES FROM POLYMERIZED OLEFINS CHLORINATED IN AQUEOUS SUSPENSION ABOVE THE AGGLOMERATION TEMPERATURE
Josef Kaupp, Helmut Klug, and Hans-Georg Kolm, all of Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed Sept. 5, 1961, Ser. No. 136,175
Claims priority, application Germany, Sept. 3, 1960,
F 32,039
11 Claims. (Cl. 260—897)

The present invention provides a process for preparing chlorine-containing synthetic rubbers by vulcanization of chlorine-containing polyolefins.

Several methods are known which enable chlorinated polyolefins to be vulcanized or to be cross-linked. These methods may be applied to chlorinated polyolefins which have been obtained by chlorination in solution, in the molten state or in an aqueous suspension, in the latter case the chlorination having been carried out at a temperatuer below the agglomeration temperature.

For example, a process is known according to which vulcanizable chlorinated polyethylenes are prepared by chlorinating polyethylene of relatively low molecular weigth in the melt at a temperature within the range of 150° to 300° C. As follows from detailed statements given in the description of the above-mentioned process the carbon chain undergoes a noticeable decomposition during the chlorination in the melt already at a chlorination temperature of slightly above 130° C. Due to this drawback the process is difficult to reproduce. Moreover, it is known by experience that a chlorination temperature of more than 150° C. leads to a strong discoloration and deterioration of the stability of the chlorination products. Besides, the mechanical properties of the cross-linking products obtained by the vulcanization of the said chlorinated polyethylenes are such that these products cannot be used as synthetic rubber.

The cross-linking of chlorinated polyolefins can also be brought about by a reaction of the said polyolefins with polyfunctional amines. According to another method of cross-linking, polyolefins, which may be chlorinated, are reacted with aliphatic polyazo compounds. According to another known process chlorinated or sulfochlorinated polymers of ethylene may be cross-linked with peroxides. The chlorination products of polyethylene mentioned in the beginning may also be cross-linked by reacting them with a metal oxide of group II of the Periodic Table and sulfur in the presence of vulcanization accelerators and filling materials, the reaction being to a high degree analogous to the vulcanization methods of natural rubber.

As follows from the detailed statements made in the literature and as we have also clearly ascertained by our own comparison tests, the cross-linkage of chlorination products which have been prepared by a chlorination in a heterogeneous way, in particular in an aqueous suspension at a temperature below the agglomeration temperature, enables only very brittle products to be obtained which can consequently not be used as rubber. This is easy to understand since, for example, polyethylenes which have been chlorinated in suspension are considerably tougher, harder and stiffer than polyethylenes which have been chlorinated in solution (see the statements made on page 270 of the monograph by A. Renfrew and Ph. Morgan entitled "Polyethylene," edited by Iliffe and Sons, London, 1957).

However, of the different methods of chlorination the heterogeneous chlorination, in particular the chlorination in an aqueous suspension, is of great industrial interest since the polyolefins which have been chlorinated in a heterogeneous way, in particular those chlorinated in an aqueous suspension, can be very easily processed. In contradistinction thereto the isolation of products which have been chlorinated in solution presents, as is known, considerable technical dfficulties.

The present invention is based on the observation that chlorination products of polyolefins having, in general, a molecular weight within the range of 10,000 to 500,000, preferably 30,000 to 200,000, which chlorination products have been prepared in a heterogeneous way, in particular in an aqueous suspension, can be vulcanized to yield products having remarkably good elastic properties by carrying out the chlorination in a temperature range in which normally an agglomeration of the polymer takes place. The chlorination may also be carried out by using from the beginning aqueous hydrochloric acid or an aqueous electrolyte solution as suspension medium.

The temperature at which the chlorination normally leads to an agglomeration of the polymer, which agglomeration is caused by sintering, depends to a large extent on the nature and the molecular weight of the polyolefin to be chlorinated. In the case of crystalline and predominantly straight chain polyethylenes having a branching of the chains of less than 3 methyl groups per 100 carbon atoms and a density of at least 0.94, i.e. polyethylenes which are predominantly obtained by the low pressure synthesis, the aforesaid temperature is above 95° C., in particular above 100° C. or even above 110° C. In the case of polyethylenes having a relatively marked branching of the chains and a lower density and which are normally prepared by polymerizing ethylene under a high pressure the said temperature limit is lower, namely at about 65° C. Crystalline isotactic polymers of propylene have an agglomeration temperature of more than 145° C. under the action of chlorine. Such special chlorination products have hitherto not been vulcanized.

The chlorinated synthetic rubbers which may be prepared by the vulcanization process according to the invention have a high elongation at break and a remarkably good tensile strength.

As starting material for the preparation of the vulcanization products according to the invention there may be used all chlorinated polyolefins which have been prepared in a heterogeneous way and chlorinated at a temperature above the temperature at which agglomeration begins. There may, for example, be used chlorinated polyolefins which are obtained by chlorinating solid pulverulent materials by the action of gaseous chlorine at a sufficiently high temperature. Especially good results are obtained with the use of chlorinated polyolefins which are obtained by chlorination in an aqueous, if desired electrolyte-containing, suspension at a temperature above 100° C., preferably above 110° C., and which are described, for example, in French Patent No.

1,227,208 and French patent of addition No. 74,211.

The process which may be modified in many ways by the application of superatmospheric pressure and by conducting the reaction in different ways—for example, continuously or discontinuously—may be modified with special success by admixing either the total quantity or part of the quantity of the filling material to be used in the vulcanization before or at the beginning of the chlorination with the polyolefin to be chlorinated. Owing to this measure the chlorination temperature can further be raised without difficulty, so that products form which otherwise would not at all be accessible because of the risk of agglomeration, which normally is strongly increased as the temperature is raised. These products are especially valuable as starting material for the vulcanization.

As examples of the filling materials which, of course, should preferably be inert there may be mentioned silicon dioxide and the various hydrates thereof (silicic acids), silicates, for example, calcium silicate, silicate-containing materials, for example, kieselgur and pumice, in particular stone powder and asbestos powder, silicon carbide, alkaline earth metal sulfates, coal, graphite, carbon black, titanium dioxide, antimony (V) sulfide, cryolite and the like.

As chloropolyolefins which may be used as starting materials for the process according to the invention there may be mentioned: chlorinated polyethylenes, in particular chlorinated polyethylenes prepared from polyethylenes having a density of at least 0.94 and a chain branching of less than 3 methyl groups per 100 carbon atoms, chlorinated polypropylene, in particular chlorination products of crystalline isotactic polypropylenes, chlorination products of crystalline copolymers of ethylene and propylene and chlorination products of homo- or copolymers of alpha-olefins having a higher molecular weight than propylene.

The chlorine content of the chlorinated polyolefins to be vulcanized is advantageously within the range of 2.5 to 60%, in particular 20 to 50%.

The vulcanization of the chlorinated polyolefins can be brought about directly by reaction with suitable chemical reactants or by the action of rays which are rich in energy, for example, ultraviolet light or radioactive rays. Vulcanization is carried out with special advantage by subjecting the chlorination products before or during the cross-linking process proper for the purpose of formation of double bonds to a partial dechlorination, dehydrochlorination or dehydration. Depending on the mixture of substances chosen, the vulcanization may also proceed simultaneously via a direct cross-linking and via modification products which have double bonds.

As examples of reactions which predominantly lead to a direct cross-linking there may be mentioned: the reaction with metals of subgroup I or main group II or subgroup II of the Periodic Table, the reaction with chlorides of sulfur, the cross-linking with di- or polyamines, mono- or polyvalent phenols having one or more nuclei, the reaction with di- or polyvalent epoxides, di- or polyvalent aliphatic or araliphatic alcoholates or mercaptides and the cross-linking with peroxides, azonitriles and elementary halogens, in particular elementary chlorine, which cross-linking probably proceeds preferably via the formation of free radicals. As examples there may be mentioned: pulverulent copper, silver, magnesium, cadmium or zinc, di-sulfur-di-chloride, hexamethylene diamine, phenol, resorcinol, 2,2'-(4,4'-dioxy)-diphenyl propane, butadiene dioxide, bis-(alpha,beta-oxidopropyl)-ether, tri-(alpha,beta-oxidopropyl)-amine, propylene glycol, 2-methyl-2,4-pentane-diol, 2,6-dimethylol-phenol, 1,4-dimercaptobutane, dicumyl-peroxyde, azodiisobutyronitrile.

The cross-linking reaction, in one stage of which, as is to be expected, olefin forms, is inter alia brought about by the addition of acceptors for hydrogen chloride or by the addition of oxidizing agents. The acceptors for hydrogen chloride generally lead to a formation of olefins by dehydrochlorination, whereas the oxidizing agents lead to a formation of olefins by dehydration. As examples of compounds which normally lead to a dehydrochlorination there may be mentioned metal oxides, metal hydroxides, metal alcoholates, metal sulfides, metal hydrogen sulfides, metal mercaptides and metal salts of slightly dissociated organic acids, for example, carbonates of alkali metals or alkaline earth metals or heavy metals or salts of fatty acids and alkali metals or alkaline earth metals or heavy metals, for example, magnesia, litharge, zinc oxide, sodium methylate, cadmium sulfide, sodium carbonate, potassium carbonate, magnesium stearate, calcium oleate, zinc palmitate and cadmium laurate.

As oxidizing agents which may be used for the formation of olefins by way of dehydrogenation there may be mentioned interalia: quinones, lead dioxide, manganese dioxide, selenium dioxide, sodium thiosulfate, alkali metal di- or polysulfides, alkaline earth metal di- or polysulfides and elementary sulfur. Elementary sulfur and compounds containing sulfur in the form of polysulfide have moreover a preferred efficiency as pronounced cross-linking agents, as is also the case in the vulcanization of natural rubber.

During the vulcanization, there may be added to the chlorinated polyolefins to which in most cases substances preventing an agglomeration have been added during the chlorination, further quantities of these substances which have already been mentioned. As filling materials there may also be used metal oxides or metal carbonates, for example, magnesia, litharge, zinc oxide, titanium dioxide, sodium carbonate, potassium carbonate, magnesium carbonate and calcium carbonate, which may be added in quantities which normally exceed the quantities required for partial dehydrochlorination.

In general it is also indicated to incorporate elastifying agents and, in addition thereto, antioxidizing agents with the mixtures to be vulcanized. As elastifiers there may be used inter alia chlorinated diphenyl, chlorinated naphthalenes, chlorinated paraffins, mono- or polyethers, mono- or polyketones, esters or partial esters of aliphatic or aromatic mono-, di- or polycarboxylic acids which may be halogenated, and phosphoric acid esters, for example, diphenyl ether, polyvinyl ether, glycerin triacetate, butyl laurate, amyl oleate, di-(2-ethylbutyl)-phthalate, dicyclohexyl phthalate, glycerin-(mono)-acetyl-ricinoleate, tributyl glycol phosphate, tri-(2-ethylhexyl)-phosphate. Thermoplasts, which have been halogenated, above all chlorinated, and which possess plasticizing properties to a sufficient extent may be used with particular advantage. As examples of such thermoplasts there may be mentioned amorphous polymers of ethylene, propylene and other alphaolefins or copolymers obtained by polymerizing these substances with one another. In cases in which chlorinated polymers are used as plasticizers the parent hydrocarbons which are of low molecular weight or amorphous and of high molecular weight may also be obtained by adding these hydrocarbons in their original unchlorinated form to the polyolefin to be chlorinated which in this case has to be provided with a sufficient quantity of inert material.

The simultaneous use of known vulcanization accelerators, for example, ethylene thiourea, tetraethyl-thiuramdisulfide, 2-mercapto-benzothiazol and N-diethyl-benzothiozolyl-2-sulfonamide, leads to the favorable effects which are usually obtained in the rubber vulcanization. In certain cases in which a sufficient quantity of vulcanization accelerator is present the use of a cross-linking agent proper of the above-mentioned class of substances may be dispensed with.

The vulcanization of chlorinated polyolefins according to the invention can also be applied with an excellent result to mixtures of chlorinated polyolefins with one another or to mixtures of chlorinated polyolefins with natural or synthetic rubbers, for example, butadiene-styrene-rubber, butyl, and nitrile-rubber types, polychlorobutadiene, alphaolefin-elastomers and polychlorosulfochlorinated polyolefins.

The chlorine-containing synthetic rubbers according to the invention are suitable for the preparation of commercial molded articles, coveyor belts, jackets of cables and wires, tubes, packings, rolls, tires, tissues subjected to friction, injection-molded articles, packings which are resistant to the action of of chemical substances and other rubber goods with the exception of latex products and solvent coatings.

The numerous methods which may be applied for the preparation of the vulcanization products according to the invention will now be explained in greater detail by the description of a special method.

The chlorinated polyolefin to be vulcanized is first mixed on a two-roller mill at a temperature within the range of 80° to 100° C., which temperature depends on the flowing properties of the mass to be processed with plasticizers, filling materials and vulcanization agents such as metal oxides and elementary sulfur and vulcanization accelarators, which substances are preferably added in the said order of sequence. Until a homogeneous mixing is attained the polyolefin is repeatedly lifted from the roller and returned to it and then rolled out into sheets about 3 mm. thick.

The rolled sheet is cut into strips, which are processed at about 100° C. in the course of about 3 minutes into plates having a diameter of 12 cm. and a thickness of about 1.5 mm., for the preparation of each plate 5 to 8 strips which have a total weight of 30 grams being used.

The vulcanization is carried out in the course of about 30 minutes at a temperature within the rage of about 150° to 180° C. with or without the application of pressure.

In addition to good mechanical and elastic properties and a great resistance to wear, the vulcanization products according to the invention possess an excellent resistance to the action of chemical substances such as acids and bases, fats, oils and in particular solvents. Moreover, the vulcanization products acording to the invention are resistant to the action of heat and light and non-combustible.

The following examples serve to illustrate the invention but they are not intended to limit it thereto.

EXAMPLE 1

Low pressure polyethylene having a $\eta_{red.}$ value of 2.0 which corresponds to a molecular weight of about 80,000 was chlorinated in an aqueous dispersion at 117° to 119° C. until its chlorine content amounted to 35.0%.

The $\eta_{red.}$ value is the measure of the reduced viscosity and may be expressed by the equation $$\eta_{red.} = \frac{1}{c} \cdot \frac{\eta - \eta_o}{\eta_o}$$

in which:

$\eta$ is the viscosity, $\eta_o$ is the viscosity of the solvent, and $c$ is the concentration of the solution in percent.

100 grams of the chlorinated polyethylene obtained were mixed on a two-roller mill at 100° C. with 2 grams of magnesium stearate, 5 grams of magnesia, 1 gram of zinc oxide, 5 grams of sulfur and 1 gram of mercaptobenzothiazol, the resulting sheet was molded by compression at 110° C. into plates which were vulcanized under pressure for 30 minutes at 180° C. (vulcanization product I).

For the purpose of comparison 100 grams of the same polyethylene which had been chlorinated to a chlorine content of 35.3% in an aqueous dispersion at 70° C. was mixed on a two-roller mill at 140° C. with the same substances as above, shaped and vulcanized under the above conditions (vulcanization product II). The mixing on the two-roller mill had to be carried out at the higher temperature of 140° C. because at lower temperatures the formation of the rolled sheet was rendered difficult.

The vulcanization products had the following mechanical properties:

| | Vulcanization, product I | Vulcanization, product II |
|---|---|---|
| Resistance to tearing | 180 kg./cm.$^2$ | 380 kg./cm.$^2$. |
| Elongation | 800% | 30%. |
| Hardness: | | |
| Shore A | About 68 | Not measurable. |
| Shore D | | About 75. |

EXAMPLE 2

A low pressure copolymer of ethylene and propylene which had a propylene portion of 10% and a $\eta_{red.}$ value of 2.4 was chlorinated in an aqueous dispersion at 118° C. to a chlorine content of 25%.

100 grams of the resulting chlorinated copolymer were mixed on a two-roller mill at 80° C. with 2 grams of magnesium stearate, 20 grams of litharge, 1 gram of zinc oxide, 5 grams of sulfur and 1 gram of mercaptobenzothiazol. The resulting rolled sheet was molded by compression at 110° C. into plates which were vulcanized under pressure for 30 minutes at 180° C.

Before and after the vulcanization the material had the following mechanical properties:

| | Before the vulcanization | After the vulcanization |
|---|---|---|
| Resistance to tearing | 60 kg./cm.$^2$ | 210 kg./cm.$^2$. |
| Elongation | 750% | 650%. |
| Hardness, Shore A | About 78 | About 82. |

EXAMPLE 3

A high pressure polyethylene having a molecular weight of about 30,000 and a density of about 0.92 was chlorinated under pressure in an aqueous dispersion at 110° C. to a chlorine content of 23%, 5%, calculated on the polyethylene, of antimony pentasulfide being added in order to avoid lump formation.

100 grams of the resulting chlorinated polyethylene were mixed on a two-roller mill at 80° C. with 2 grams of magnesium stearate, 5 grams of magnesia, 5 grams of sulfur, 1 gram of zinc oxide and 2 grams of mercaptobenzothiazol.

The sheet obtained was molded by compression at 110° C. into plates which were vulcanized under pressure for 30 minutes at 180° C.

| | Properties | |
|---|---|---|
| | Before the vulcanization | After the vulcanization |
| Resistance to tearing | 35 kg./cm.$^2$ | 70 kg./cm.$^2$. |
| Elongation | 700% | 675%. |
| Hardness, Shore A | About 65 | About 65. |

We claim:

1. A process for preparing chlorine-containing synthetic rubbers comprising vulcanizing a heterogeneously chlorinated polymer of mono olefin, said polymer having a molecular weight within a range of 10,000 to 500,000 and said chlorination having been conducted in an aqueous suspension and at a temperature above the agglomeration temperature of said polymer.

2. A process according to claim 1 wherein said polymer is selected from the group consisting of polyethylene, polypropylene, copolymers of ethylene and propylene, and mixtures thereof.

3. A process according to claim 1 wherein the chlorinated polymer is vulcanized by a chemical reaction.

4. A process according to claim 1 wherein the chlorinated polymer is vulcanized by radiation.

5. A process according to claim 1 wherein the chlorinated polymer contains from 2.5 to 60% by weight of chlorine.

6. The chlorine-containing synthetic rubber produced by the process of claim 1.

7. A process for preparing chlorine-containing synthetic rubbers comprising vulcanizing a chlorinated polymer of a mono alpha olefin produced by the heterogeneous chlorination of said polymer in an aqueous suspension in the presence of filling agents at a temperature above the agglomeration temperature of said polymer, said polymer having a molecular weight within a range of 10,000 to 500,000.

8. A process according to claim 7 wherein the polymer is selected from the group consisting of polyethylene, polypropylene, copolymers of ethylene and propylene, and mixtures thereof.

9. The chlorine-containing synthetic rubber produced by the process of claim 7.

10. The chlorine-containing synthetic rubber of claim 6 which contains as an additive a plasticizer.

11. The chlorine-containing synthetic rubber of claim 6 containing as an additive a filler.

References Cited by the Examiner

UNITED STATES PATENTS

| | | | |
|---|---|---|---|
| 2,183,556 | 12/1939 | Fawcett | 260—94 |
| 2,416,069 | 2/1947 | Scott | 260—79.5 |
| 2,480,007 | 7/1947 | Fletcher | 260—94.9 |
| 3,180,856 | 4/1965 | Szalla et al. | 260—94.9 |

FOREIGN PATENTS 1,227,208  8/1960  France.

OTHER REFERENCES

Charlesby: A., Atomic Radiation and Polymers, New York, Pergammon Press, 1960, pp. 198–257.

SAMUEL H. BLECH, *Primary Examiner.*

LEON J. BERCOVITZ, MURRAY TILLMAN,
*Examiners.*